US012792089B2

(12) United States Patent
Mentken

(10) Patent No.: US 12,792,089 B2
(45) Date of Patent: Nov. 10, 2026

(54) KEYBOARD COVER FOR CONVERTIBLE LAPTOP-TABLET DEVICE

(71) Applicant: Oliver Ian Mentken, Albuquerque, NM (US)

(72) Inventor: Oliver Ian Mentken, Albuquerque, NM (US)

(73) Assignee: Oliver Ian Mentken, Albuquerque, NM (US)

( * ) Notice: Subject to any disclaimer, the term of this patent is extended or adjusted under 35 U.S.C. 154(b) by 8 days.

(21) Appl. No.: 19/056,455

(22) Filed: Feb. 18, 2025

(65) Prior Publication Data

US 2026/0244242 A1 Aug. 20, 2026

(51) Int. Cl.

*G06F 1/16* (2006.01)
*H05K 5/00* (2025.01)
*H05K 7/00* (2006.01)

(52) U.S. Cl.

CPC .......... *G06F 1/1629* (2025.01); *G06F 1/1618* (2013.01)

(58) Field of Classification Search

CPC .. H03K 17/96; H03K 17/9618; H03K 17/967; H03K 17/972; G06F 1/1629; G06F 1/1618; G06F 1/1679; G06F 1/1607; G06F 1/1616; G06F 1/1624; G06F 1/1637; G06F 1/166; G06F 1/1632; G06F 1/1633; G06F 1/1654; G06F 1/1662; G06F 1/1656

See application file for complete search history.

(56) References Cited

U.S. PATENT DOCUMENTS

| | | | | |
|---|---|---|---|---|
| 8,169,332 B2 * | 5/2012 | Son | G06F 3/0418 | 340/665 |
| 8,687,360 B2 * | 4/2014 | Nakada | G06F 1/1616 | 361/679.55 |
| 8,746,449 B2 * | 6/2014 | Gallagher | F16M 13/04 | 206/320 |
| 9,335,793 B2 * | 5/2016 | Rothkopf | G06F 1/1643 | |
| 2007/0001079 A1 * | 1/2007 | Patterson, Jr. | A45C 11/00 | 248/300 |
| 2008/0284689 A1 * | 11/2008 | Kim | G06F 3/0202 | 345/55 |
| 2015/0359120 A1 * | 12/2015 | Huang | A45C 11/00 | 206/45.23 |
| 2017/0163304 A1 * | 6/2017 | Cha | A45C 11/00 | |
| 2018/0120896 A1 * | 5/2018 | Wallace | G06F 1/1643 | |
| 2023/0324957 A1 * | 10/2023 | Thomas-Brigden | G06F 1/1647 | |
| 2024/0004433 A1 * | 1/2024 | Wolfson | H04B 1/3877 | |

* cited by examiner

*Primary Examiner* — Anthony M Haughton
(74) *Attorney, Agent, or Firm* — Ashurst Perkins Coie US LLP; Matthew S. Williams; Jacob D. Gober

(57) ABSTRACT

The present technology is generally directed to keyboard covers for convertible laptop-tablet devices. In particular, the keyboard covers are designed to cover the keyboard and/or touchpad of laptop computers when the laptop computer is being used in a tablet mode. The keyboard covers are expected to improve the comfort, usability, and/or durability of laptop computer when being operated in the tablet mode.

20 Claims, 12 Drawing Sheets

KEYBOARD COVER FOR CONVERTIBLE LAPTOP-TABLET DEVICE

TECHNICAL FIELD

The present technology is generally related to accessories for computing devices, and more specifically to a keyboard cover for convertible laptop-tablet devices.

BACKGROUND

Various laptop computers can be converted between a standard laptop configuration in which a user interacts with the laptop using a standard keyboard and touchpad and a tablet configuration in which a user interacts with the laptop using a touchscreen. While such laptops provide a user with enhanced flexibility that enables a user to utilize the laptop as a tablet, such laptops are typically not as comfortable or functional as a dedicated tablet device when being used in tablet mode. Accordingly, a need exists for improving the comfort and usability of convertible laptop-tablet devices when being used in tablet mode.

DETAILED DESCRIPTION

The present technology is generally directed to keyboard covers for convertible laptop-tablet devices. In particular, the keyboard covers are designed to cover the keyboard and/or touchpad of laptop computers when the laptop computer is being used in a tablet mode. As described throughout this Detailed Description, the keyboard covers are expected to improve the comfort, usability, and/or durability of laptop computer when being operated in the tablet mode.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the claims but are not described in detail with respect to FIGS. 1A-6.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%. For example, the use of the term "about 100" refers to a range of from 90 to 110, inclusive. In instances in which relative terminology is used in reference to something that does not include a numerical value, the terms are given their ordinary meaning to one skilled in the art.

Figure 1A:
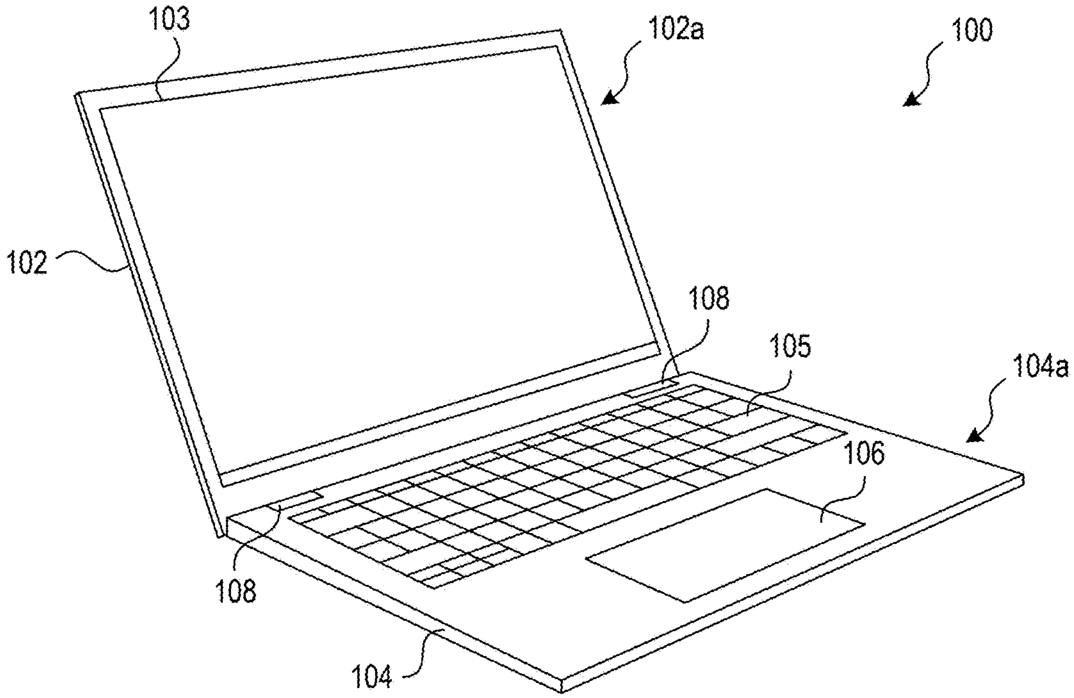
FIGS. 1A-1D illustrate various configurations of a convertible laptop-tablet device.

FIGS. 1A-1D are isometric views of a convertible laptop-tablet device 100 ("the device 100," "the laptop computer 100," or "the laptop 100") that is convertible between a laptop mode and a tablet mode. More specifically, in FIG. 1A the laptop computer 100 is in the laptop mode, in FIG. 1B the laptop computer 100 is in a transition mode between the laptop mode and the tablet mode, and in FIGS. 1C and 1D the laptop computer 100 is in the tablet mode. Referring first to FIG. 1A, the laptop computer 100 includes a top panel 102 and a base panel 104. Similar to conventional laptop computers, the top panel 102 has a top panel first side 102*a* that includes a screen 103, and the base panel 104 has a base panel first side 104*a* that includes a keyboard 105 and a touchpad 106. As one skilled in the art will appreciate, the screen 103, the keyboard 105, and the touchpad 106 can have other shapes, sizes, arrangements, or the like as is known in the computer industry. Similarly, the laptop computer 100 may include additional features not shown in FIGS. 1A-1D, such as an integrated camera, microphone, data and/or power ports (e.g., USB ports, USB-C ports, etc.), stylus pen, and/or the like.

Figure 1B:
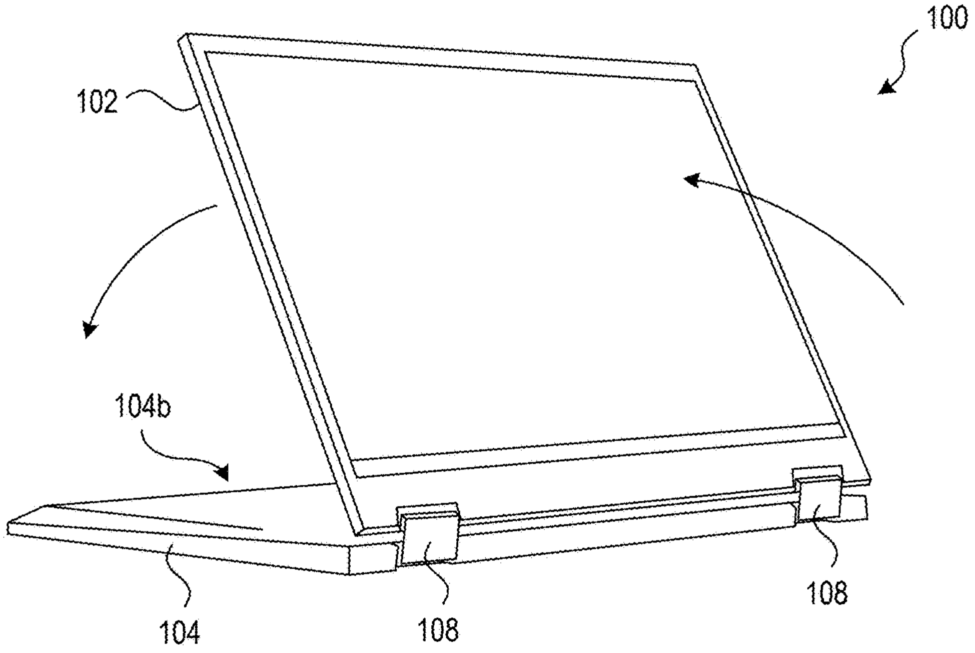
Figure 1C:
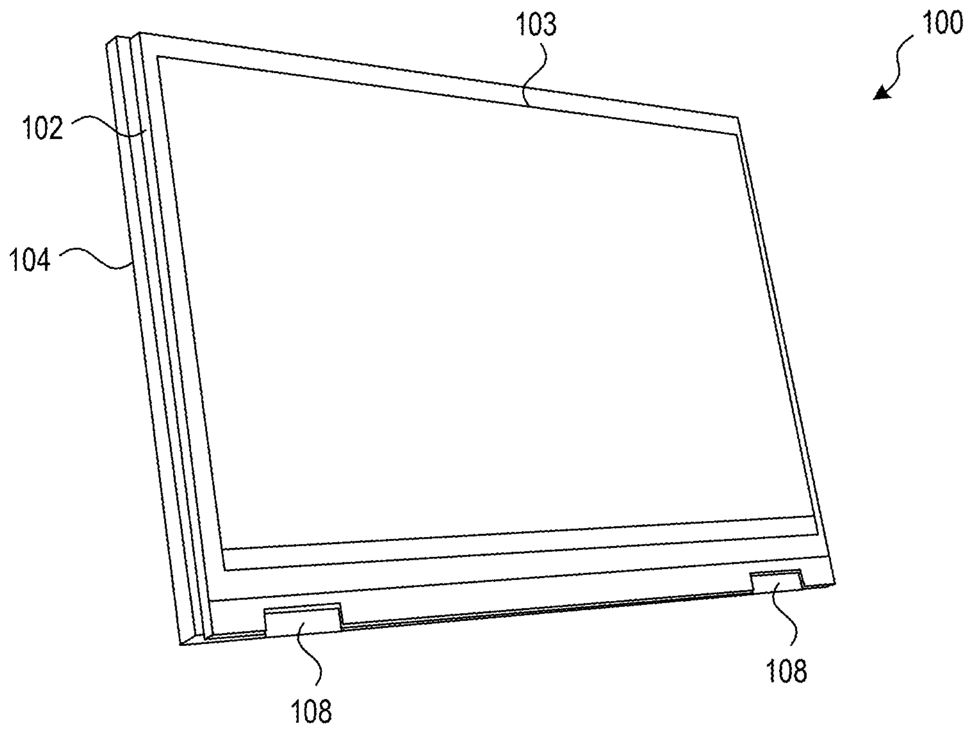

The laptop computer 100 further includes one or more hinges 108 that hingedly couple the top panel 102 and the base panel 104. Although two hinges 108 are shown, in other embodiments the laptop computer 100 can have more or fewer hinges 108. The hinges 108 enable the top panel 102 and the base panel 104 to move (e.g., rotate) relative to one another. For example, to close the laptop computer 100, the top panel 102 can be rotated about the hinges 108 and relative to the base panel 104 until the top panel first side 102*a* with the screen 103 contacts the base panel first side 104*a* with the keyboard 105 and touchpad 106. Similarly, as shown in FIGS. 1A-1C, the laptop computer 100 can be converted between the laptop mode (FIG. 1A) and the tablet mode (FIG. 1C) by rotating the top panel 102 relative to the base panel 104 about the hinges 108 in the direction indicated by the arrows in FIG. 1B until a top panel second side (not visible) of the top panel 102 opposite the top panel first side 102*a* and a base panel second side 104*b* of the base panel 104 opposite the keyboard 105 and the touchpad 106 contact one another. In the tablet mode, a user can interact with the laptop computer 100 using the screen 103 in a manner similar to how a user would interact with other tablets known in the art (e.g., an Apple iPad, a Samsung Galaxy tablet, etc.).

Figure 1D:
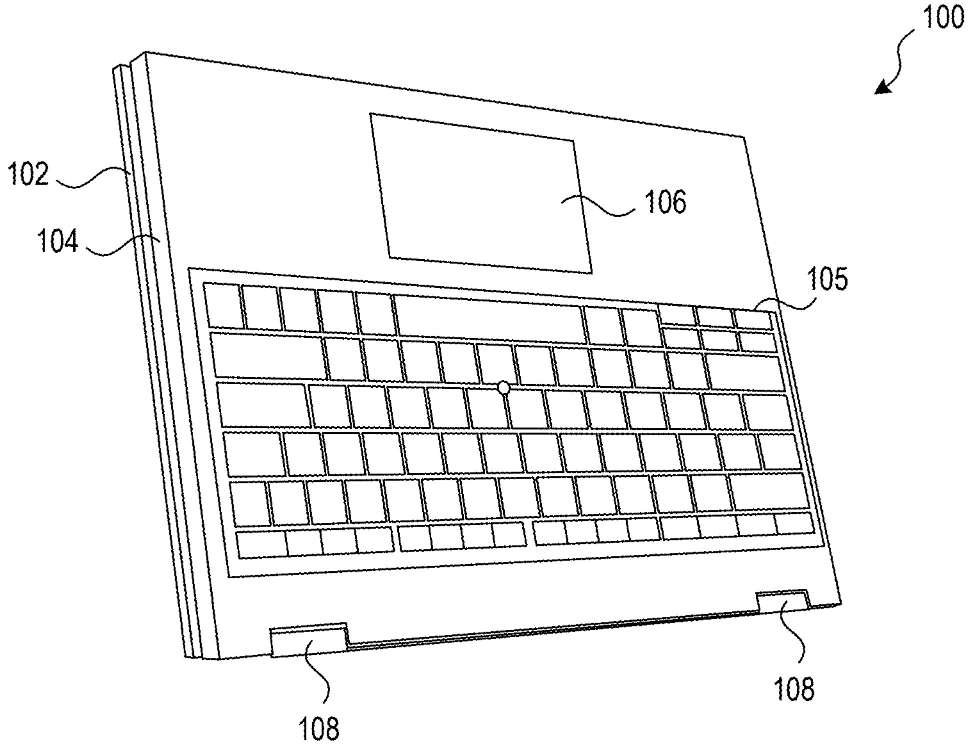

As shown in FIG. 1D, when the laptop computer 100 is in the tablet mode, the keyboard 105 and the touchpad 106 are exposed. This presents several challenges. First, the exposed keyboard 105 and/or touchpad 106 may be uncomfortable and/or awkward for the user to hold or touch. Second, the exposed keyboard 105 and/or touchpad 106 may be uncomfortably warm to user touch. Third, the exposed keyboard 105 and/or touchpad 106 may collect dust, dirt, or other debris that may degrade the performance of the laptop computer 100.

Figure 2A:
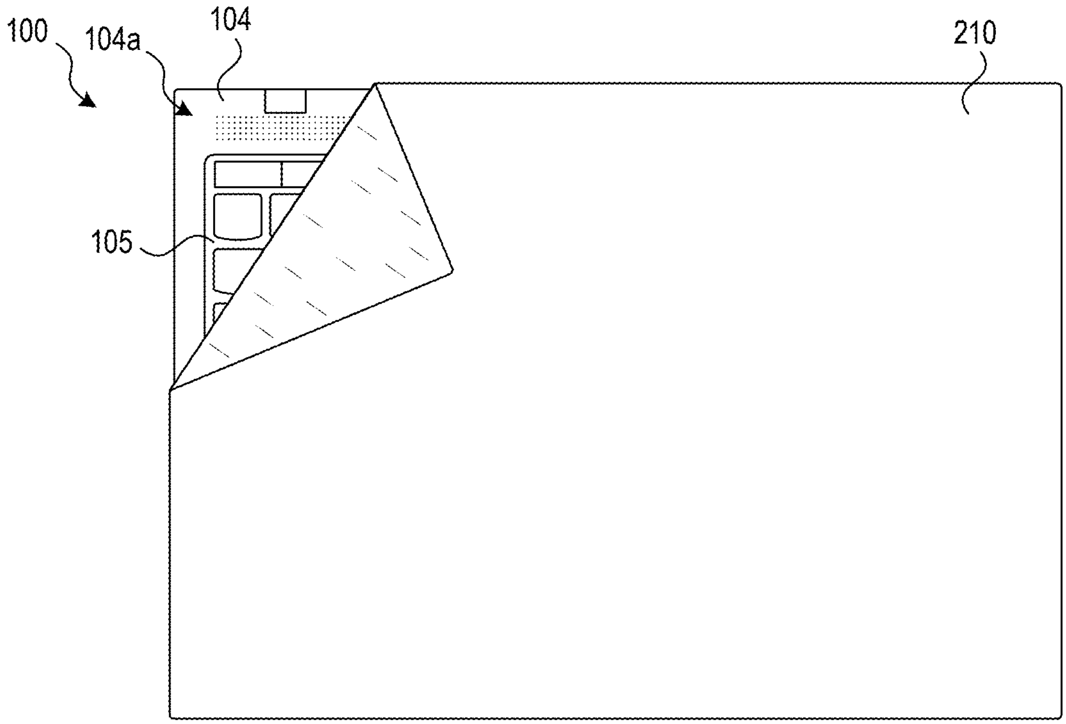
FIGS. 2A and 2B illustrate a keyboard cover attached to the convertible laptop-tablet device of FIGS. 1A-1D and configured in accordance with embodiments of the present technology.
Figure 2B:
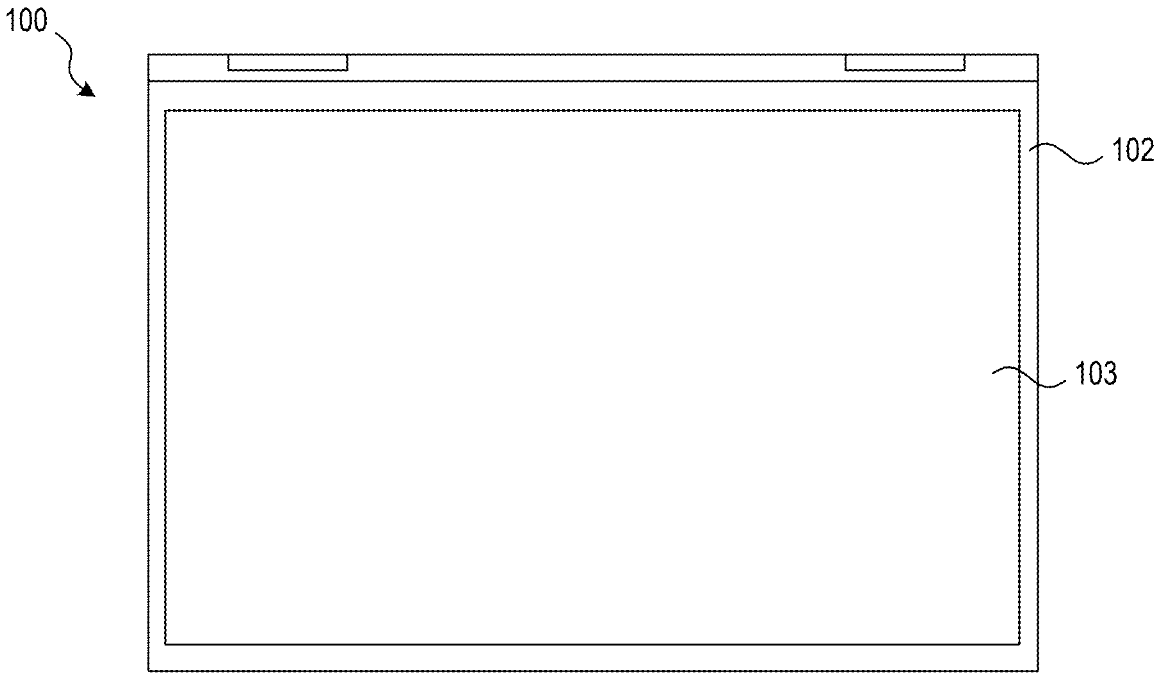

The present technology includes keyboard covers designed to cover a keyboard and/or touchpad of a laptop computer when the laptop computer is in a tablet mode to mitigate one or more of these challenges. For example, FIG. 2A is a top view of a keyboard cover 210 configured in accordance with embodiments of the present technology and that covers the keyboard 105 and the touchpad 106 when the laptop computer 100 of FIGS. 1A-1D is in tablet mode. FIG. 2B is also top view of the laptop computer 100 in tablet mode, but rotated 180 degrees relative to the view in FIG. 2A to illustrate the top panel 102. Referring first to FIG. 2A, the keyboard cover 210 can have different sizes and shapes. In the illustrated embodiment, for example, the keyboard cover 210 covers the entire base panel first side 104*a* of the base panel 104. In other embodiments, the keyboard cover 210 covers only a portion of the base panel first side 104*a*, such as the keyboard 105 and/or the touchpad 106. The keyboard cover 210 can be composed of a material that is comfortable to a user to grasp, including, but not limited to, leather, plastic, neoprene, elastomers such as silicone, rubber, and/or other suitable materials. The keyboard cover 210 can also have a thickness and/or durometer that minimizes or even eliminates the ability of the user to feel the keyboard 105 through the keyboard cover 210. The keyboard cover 210 can be designed to protect the keyboard 105 and/or touchpad 106 by acting as a barrier against dust, dirt, and/or other debris. In some embodiments, the keyboard cover 210 can be composed of a waterproof or water-resistant material, and/or be impregnated with a waterproof or water-resistant material. In some aspects of the present technology, as best shown in FIG. 2B, the keyboard cover 210 does not cover or otherwise interfere with the screen 103 when coupled to the laptop computer 100, enabling a user to interact with the screen 103 in a normal manner. The keyboard cover 210 is therefore configured to improve the comfort, durability, and/or usability of laptops when in tablet mode.

Figure 3A:
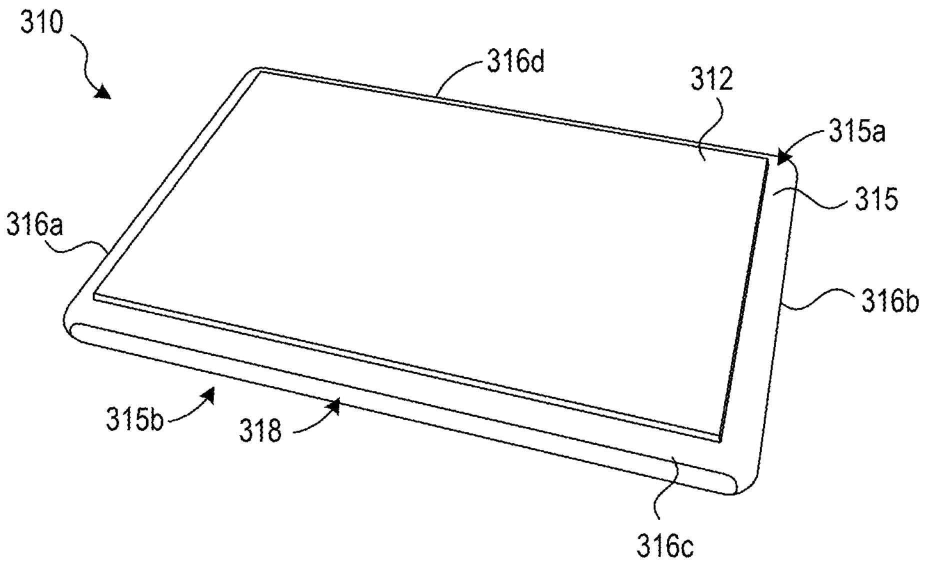
FIGS. 3A-3E illustrate another embodiment of a keyboard cover for use with a convertible laptop-tablet device and configured in accordance with embodiments of the present technology.

FIG. 3A is an isometric view of a keyboard cover 310 ("the cover 310") configured in accordance with embodiments of the present technology. The cover 310 includes a body or sleeve 315 having a generally rectangular shape with a slot 318 extending therethrough. The sleeve 315 includes a first flat or planar surface 315*a* (e.g., the upward facing surface of the sleeve 315 in FIG. 3A) and a second flat or planar surface 315*b* (e.g., the downward facing surface of the sleeve 315 in FIG. 3A) that are opposite from and parallel to each other. The first planar surface 315*a* and the second planar surface 315*b* are connected by lateral edges 316*a-d*. The slot 318 extends between and through the third edge 316*c* and the fourth edge 316*d*. As described in greater detail below with reference to FIGS. 3B-3E, the slot 318 can be sized and shaped to receive a portion of a laptop computer (e.g., the base panel 104 of the laptop computer 100 of FIGS. 1A-1D). The sleeve 315 can be composed of a compressible and/or elastic material such as neoprene, nylon, polyester, silicone, natural rubber, synthetic rubber, foam, and/or the like. In some embodiments, a thickness of the material at each of the first planar surface 315*a* and the second planar surface 315*b* is the same or at least about the same, and can range from about 0.05 cm to about 1.0 cm, or between about 0.05 cm and about 0.4 cm.

The cover 310 can optionally include a secondary panel 312 coupled to the first planar surface 315*a* of the sleeve 315. For example, in the illustrated embodiment, the secondary panel 312 is a generally flat panel that is positioned over a majority of the first planar surface 315*a* of the sleeve 315. The secondary panel 312 can be coupled to the sleeve 315 via stitching, sewing, stapling, gluing, taping, chemical bonding, or other adhesion techniques. The secondary panel 312 can be composed of a material that is stiffer than the material that the sleeve 315 is composed of. For example, the secondary panel 312 can be composed of leather, synthetic leather, plastic, high durometer rubber or other polymer, or the like. In some embodiments, a thickness of the secondary panel 312 is between about 0.1 cm and about 1.0 cm, or between about 0.4 cm and about 0.8 cm. In some embodiments, the secondary panel 312 is omitted from the cover 310. In yet other embodiments, the edges 316*a-d* are directly coupled to the secondary panel 312 and the first planar surface 315*a* is omitted.

Figure 3B:
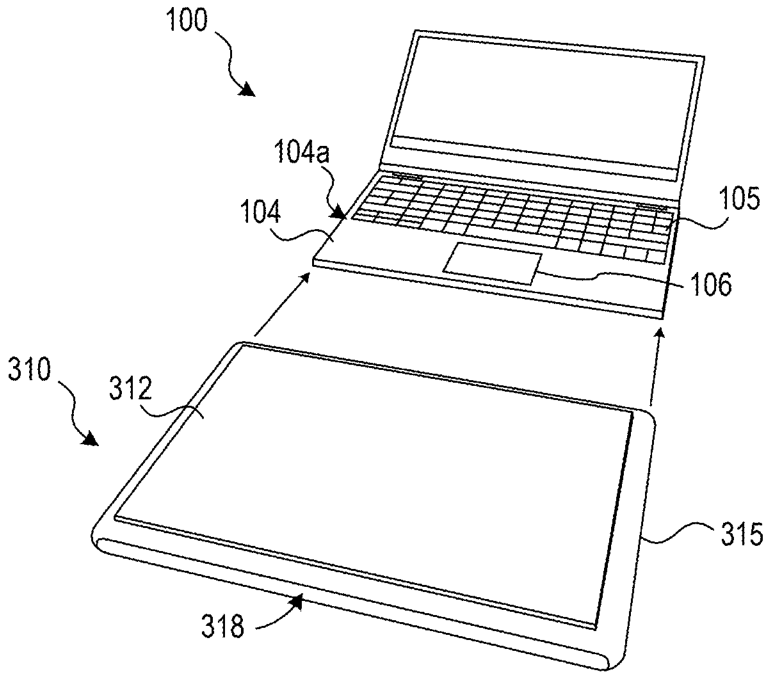
Figure 3C:
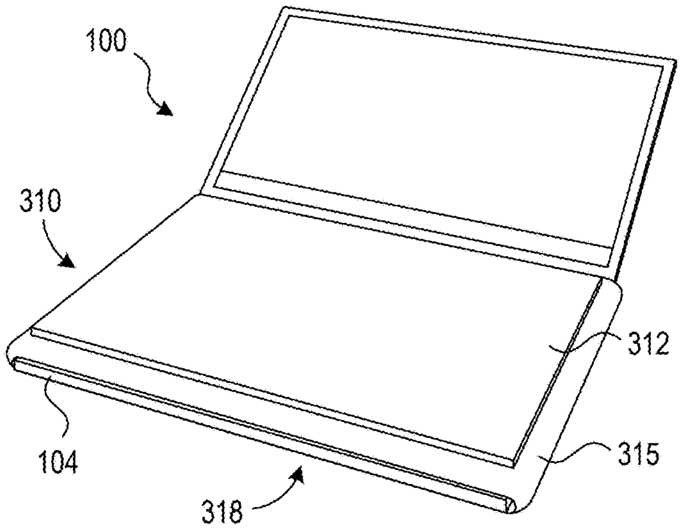
Figure 3D:
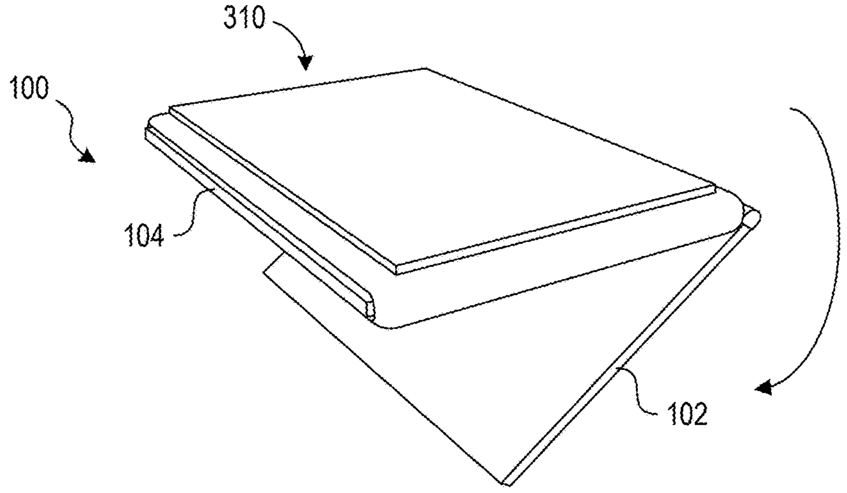
Figure 3E:
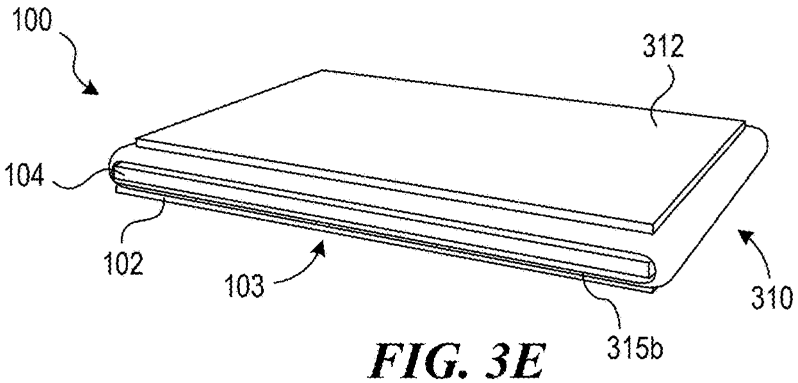

Regardless of its construction, the cover 310 can be coupled to a laptop computer such as the laptop 100 by sliding the base panel 104 into the slot 318 extending through the cover 310. FIG. 3B is an isometric view that shows the cover 310 in the process of being coupled to the laptop 100, and FIG. 3C is an isometric view that shows the cover 310 coupled to the laptop 100. Referring collectively to FIGS. 3B and 3C, the side of the cover 310 with the secondary panel 312 can be positioned over the base panel first side 104*a* of the base panel 104 (e.g., over the keyboard 105 and the touchpad 106). Next, as shown in FIGS. 3D and 3E, the laptop 100 can be converted into tablet mode by rotating the top panel 102 relative to the base panel 104 as indicated by the arrow and described above with reference to FIGS. 1B-1D. When in tablet mode, the second planar surface 315*b* of the sleeve 315 (e.g., the side that is opposite the secondary panel 312) is positioned between the top panel 102 and the base panel 104 of the laptop 100. As set forth above, the second planar surface 315*b* may be compressible and/or have a thickness that enables the top panel 102 and the base panel 104 to lay substantially flat against each other, despite there being a piece of material positioned therebetween. In other words, the second planar surface 315*b* is relatively thin so that the laptop 100 can be used in tablet mode in the same manner as if a portion of the cover 310 was not positioned between the top panel 102 and the base panel 104. This configuration can also help hold the cover 310 in position when the laptop 100 is in tablet mode.

Advantageously, the secondary panel 312 covers both the keyboard 105 and the touchpad 106 when the laptop 100 is in tablet mode. A user of the laptop 100 will therefore touch and feel the secondary panel 312 instead of the keyboard 105 and the touchpad 106 when operating the laptop 100 in tablet mode. In some aspects of the present technology, the secondary panel 312 can provide a more favorable tactile sensation to the user compared to the keyboard 105 and the touchpad 106 when operating the laptop 100 in tablet mode. The cover 310 can also insulate the laptop 100 to reduce or prevent the heat that a user may feel when operating the laptop 100 in tablet mode. The cover 310 also protects the keyboard 105 and the touchpad 106 from dirt, dust, and other debris.

Figure 4A:
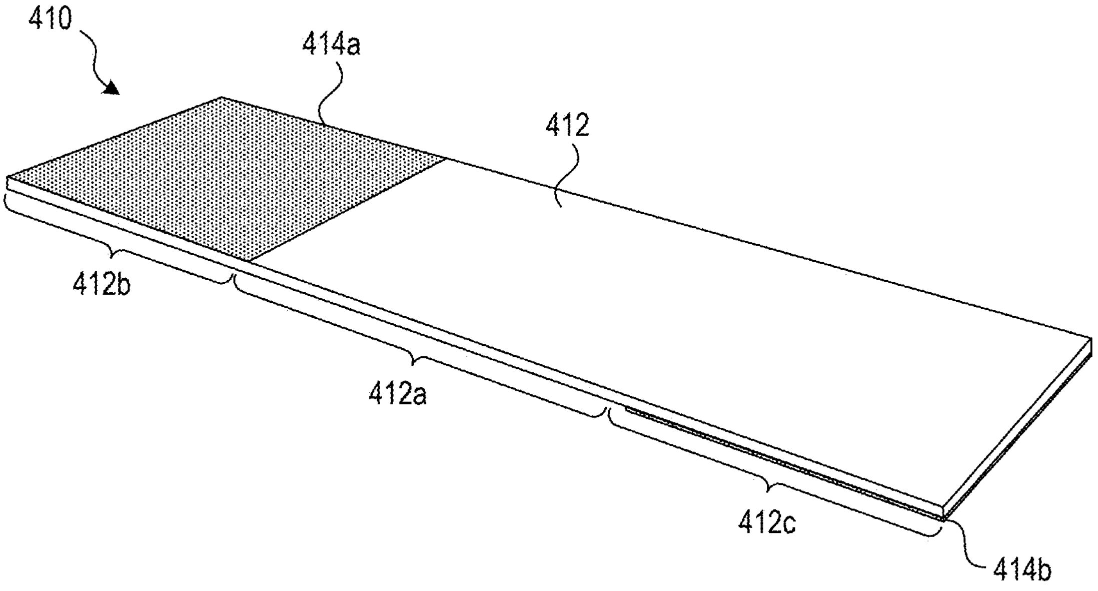
FIGS. 4A-4H illustrate yet another embodiment of a keyboard cover for use with a convertible laptop-tablet device and configured in accordance with embodiments of the present technology.
Figure 4B:
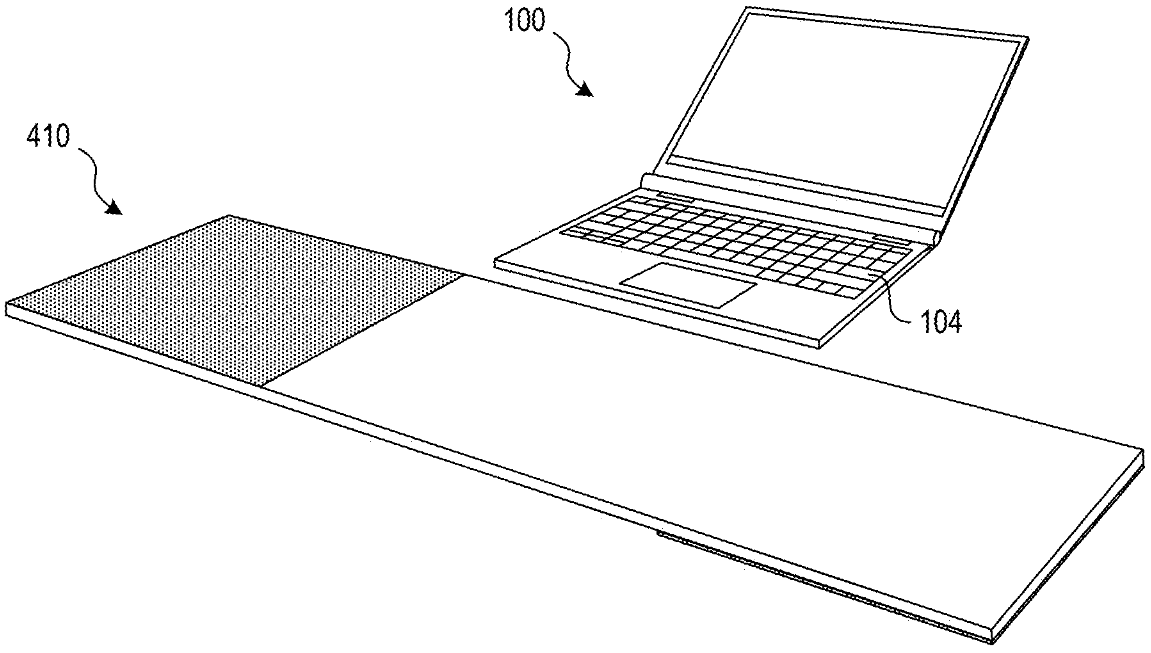

FIG. 4A is an isometric view of a keyboard cover 410 ("the cover 410") configured in accordance with additional embodiments of the present technology. The cover 410 includes a panel 412 (e.g., strip, sheet, etc.) having a rectangular or generally rectangular shape. The panel 412 includes a first region or segment 412*a*, a second region or segment 412*b* positioned on one side of the first segment 412*a*, and a third region or segment 412*c* positioned on the other side of the first segment 412*a* (collectively referred to as "the segments 412*a-c*). Each of the segments 412*a-c* can be the size and shape of a laptop panel, such as the base panel 104 of the laptop 100 of FIGS. 1A-1D. In some embodiments, the segments 412*a-c* are joined by hinges that enable segments 412*a-c* to rotate relative to one another (e.g., the first segment 412*a* and the second segment 412*b* are joined by a first hinge, and the first segment 412*a* and the third segment 412*c* are joined by a third hinge). In other embodiments, however, the segments 412*a-c* are formed of a continuous, unitary piece of the same material (e.g., without hinges separating the segments 412*a-c*). In such embodiments, the boundary between the segments 412*a-c* can optionally be thinner than the other portions of the panel 412, e.g., to facilitate bending the segments 412*a-c* relative to one another. In some embodiments, the panel 412 is composed of a pliable material such as felt, nylon, leather, neoprene, polyester, silicone, natural rubber, synthetic rubber, foam, or the like. The panel 412 can have a thickness of between about 0.05 cm and about 1 cm, such as between about 0.05 cm and about 0.4 cm.

The cover 410 further includes a first connector pad 414*a* and a second connector pad 414*b* (collectively referred to as "the connector pads 414*a-b*"). The first connector pad 414*a* can be coupled to the second segment 412*b* of the panel 412 and the second connector pad 414*b* can be coupled to the third segment 412*c* of the panel 412. Of note, the first connector pad 414*a* and the second connector pad 414*b* are coupled to opposite surfaces of the panel 412. The connector pads 414 can be coupled to the panel 412 via stitching, sewing, stapling, gluing, taping, chemical bonding, or other adhesion techniques. Although the first connector pad 414*a* and the second connector pad 414*b* are described as being coupled to the panel 412, in some embodiments, the first connector pad 414*a* and the second connector pad 414*b* are integral with the panel 412. Further, although shown as covering the entirety of the second segment 412*b* and the third segment 412*c*, in other embodiments the connector pads 414*a-b* only cover certain areas of the second segment 412*b* and/or the third segment 412*c*.

The connector pads 414*a-b* are designed to releasably adhere to each other when placed in physical contact. For example, the connector pads 414*a-b* can include a hook-and-loop fastener (e.g., Velcro), with one of the connector pads 414 having the hooks and the other of the connector pads 414 having the loops. In other embodiments, the connector pads 414*a-b* can comprise other types of releasable connection mechanisms, such as snaps, magnets, or the like.

Figure 4C:
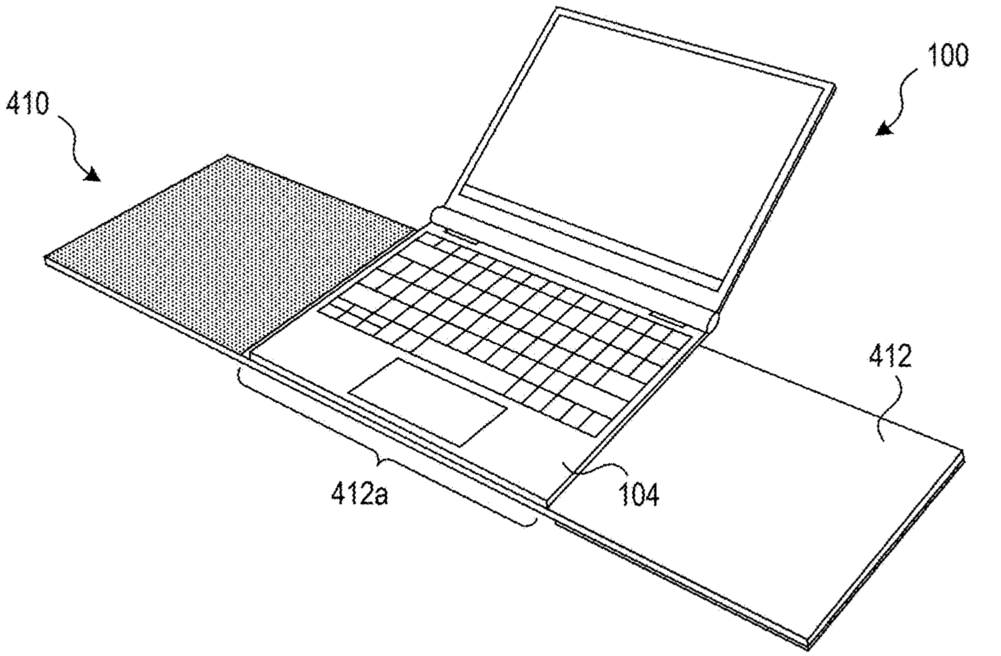
Figure 4D:
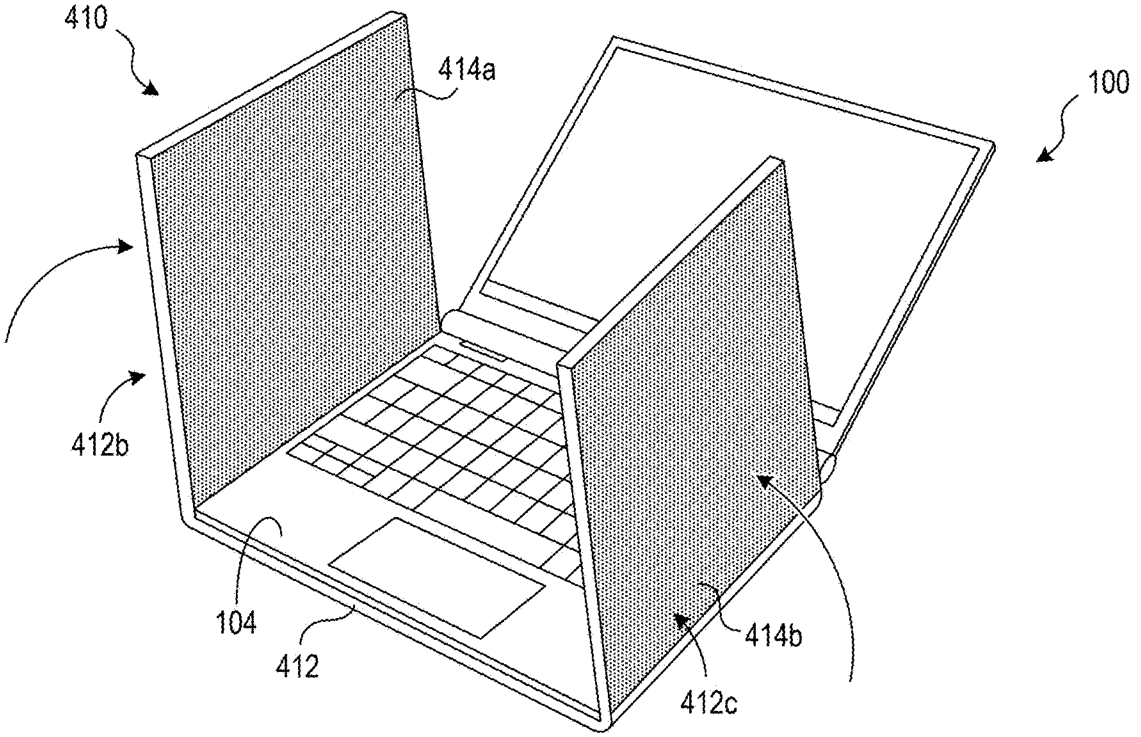
Figure 4E:
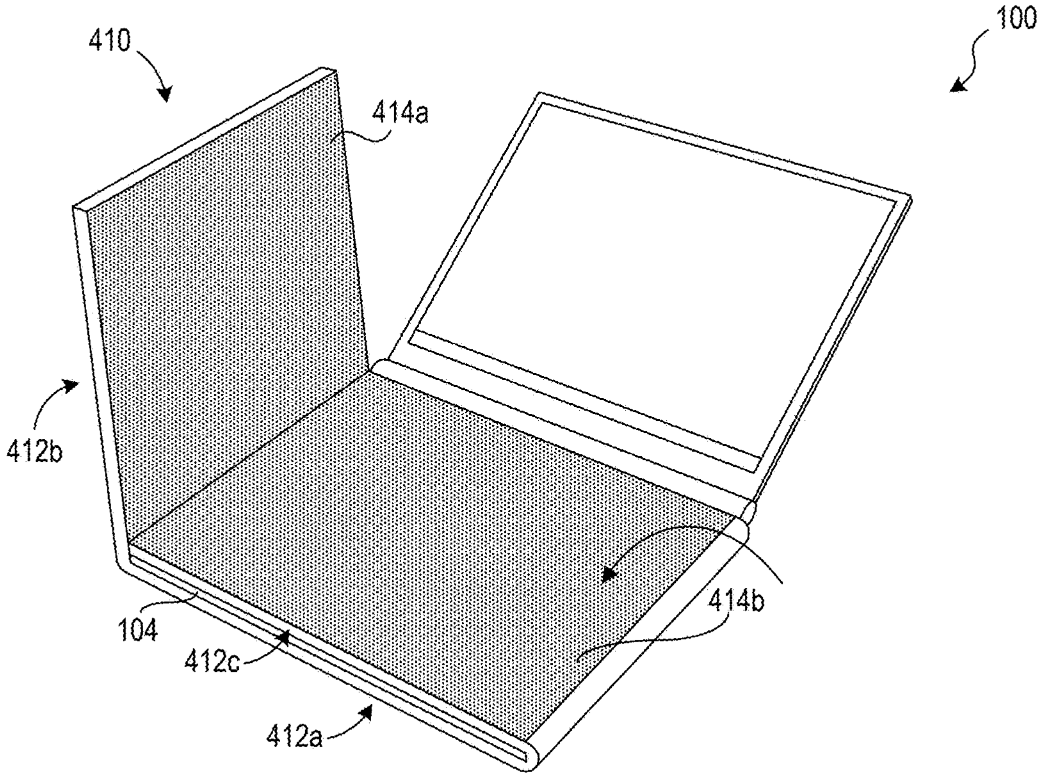
Figure 4F:
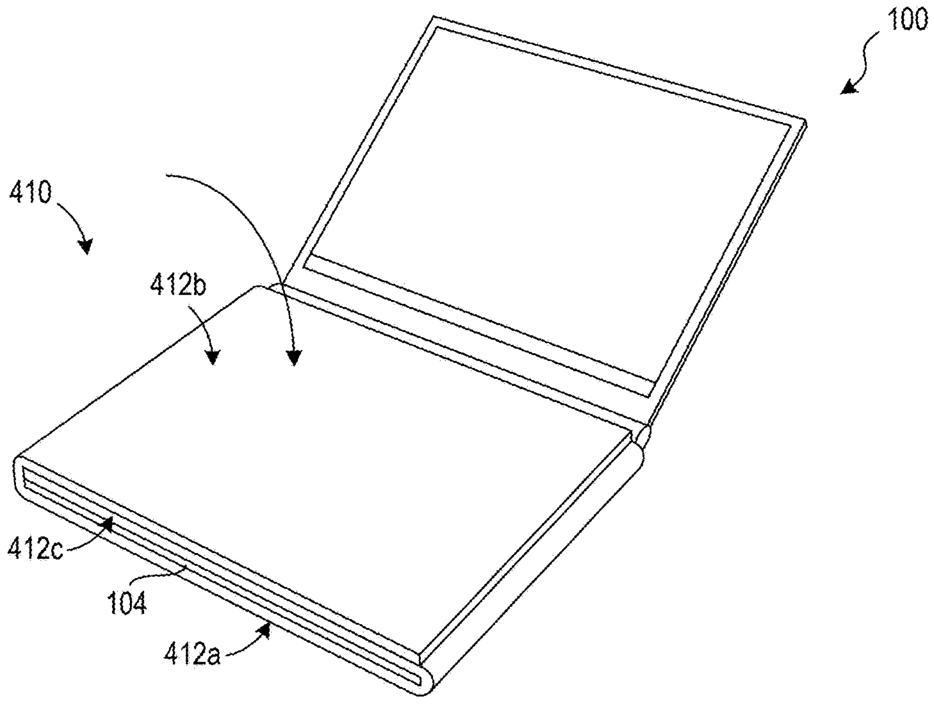

The cover 410 can be coupled to a laptop computer such as the laptop 100 of FIGS. 1A-1D to cover and/or protect the keyboard 105 and the touchpad 106 when the laptop 100 is in tablet mode. FIGS. 4B-4H are isometrics views of the cover 410 and the laptop 100 that illustrate various stages of coupling the cover 410 to the laptop 100. To couple the cover 410 to the laptop 100, the base panel 104 of the laptop 100 is positioned over the first segment 412*a* of the panel 412, as shown in FIG. 4C. Next, as shown in FIGS. 4D and 4E, the third segment 412*c* of the panel 412 can be folded over the base panel 104 of the laptop 100 as indicated by the arrows such that the third segment 412*c* covers the keyboard 105 and the touchpad 106 and the second connector pad 414*b* is facing away from the base panel 104. As shown in FIGS. 4E and 4F, the second segment 412*b* of the panel 412 can then also be folded over the base panel 104 as indicated by the arrow until the first connector pad 414*a* contacts and is releasably secured to the second connector pad 414*b*, such that the segments 412*a-c* are generally parallel to each other. Because the first connector pad 414*a* and the second connector pad 414*b* provide a releasable connection (e.g., via Velcro), the second segment 412*b* and the third segment 412*c* can be pulled apart and readjusted, if needed.

Figure 4G:
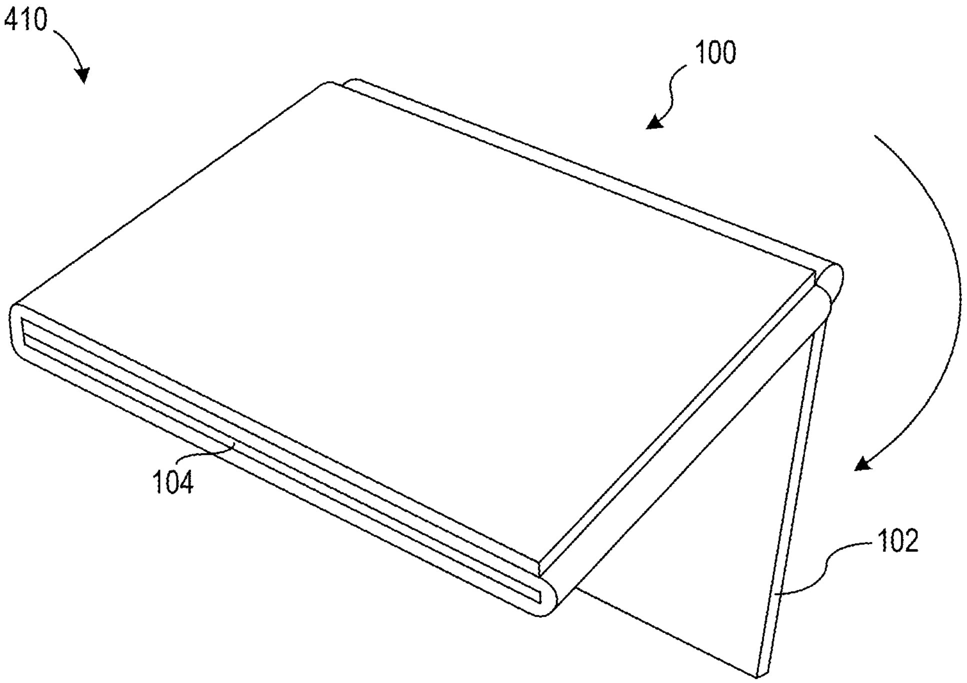
Figure 4H:
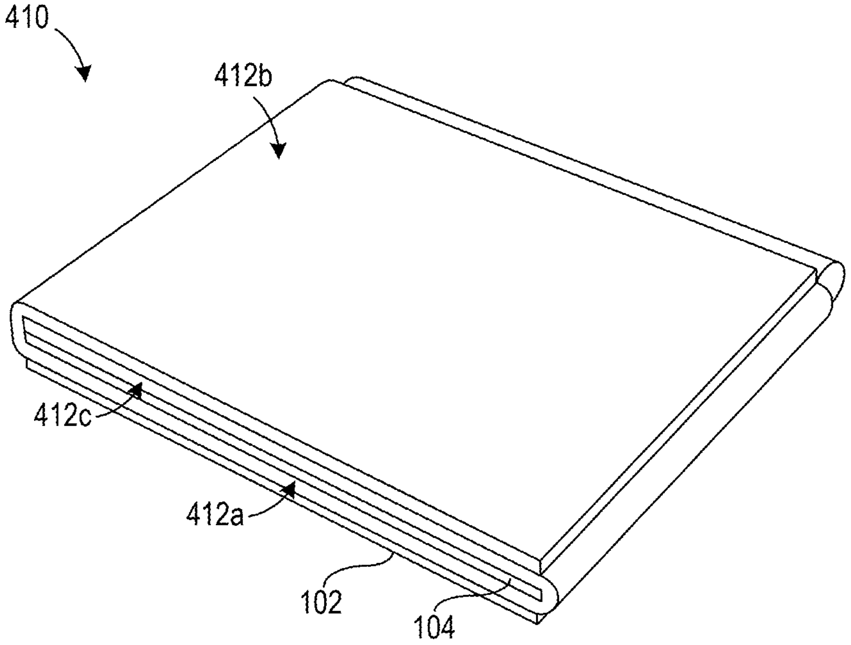

Next, as shown in FIGS. 4G and 4H, the laptop 100 can be converted into tablet mode by rotating the top panel 102 relative to the base panel 104, as indicated by the arrow in FIG. 4G and described above with reference to FIGS. 1B-1D. When in tablet mode, the first segment 412*a* of the cover 410 is positioned between the top panel 102 and the base panel 104. As set forth above, the first segment 412*a* may be relatively thin to enable the top panel 102 and the base panel 104 to lay substantially flat against each other, despite there being a piece of material positioned therebetween. This configuration can also help hold the cover 410 in position when the laptop 100 is in tablet mode. Also in tablet mode, the second segment 412*b* and the third segment 412*c* cover the keyboard 105 and the touchpad 106. Similar to the cover 310 described with reference to FIGS. 3A-3E, the cover 410 can therefore provide improved user experience by providing an improved tactile sensation and reducing the heat felt by the user, as well protecting the keyboard 105 and the touchpad 106 from dust, dirt, and other debris.

Figure 5A:
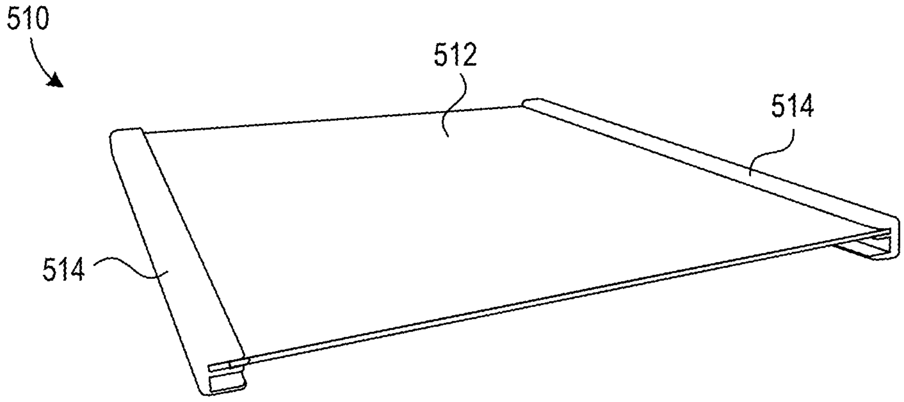
FIGS. 5A-5E illustrate yet another embodiment of a keyboard cover for use with a convertible laptop-tablet device and configured in accordance with embodiments of the present technology.

FIG. 5A is an isometric view of a keyboard cover 510 ("the cover 510") configured in accordance with additional embodiments of the present technology. The cover 510 includes a panel or pad 512 extending between two clips 514. The panel 512 has a rectangular or generally rectangular shape and a size corresponding to a laptop panel, such as the base panel 104 of the laptop 100 of FIGS. 1A-1D. The panel 512 can be composed of an elastic material such as neoprene, nylon, polyester, silicone, natural rubber, synthetic rubber, foam, or the like. In some embodiments, the panel 512 has a thickness of between about 0.1 cm and about 2 cm, or between about 0.2 cm and about 0.6 cm, although in other embodiments the panel 512 can have a greater thickness. Although not shown, the panel 512 can optionally have one or more secondary patches or panels adhered to a portion of the panel 512 for further improved user experience and/or protection (e.g., similar to how the secondary panel 312 is coupled to the sleeve 315 in the cover 310 described with reference to FIG. 3A). The secondary patches or panels can be composed of a different material than the panel 512. For example, the secondary patches or panels can be composed of leather, synthetic leather, plastic, high durometer rubber or other polymer, or the like.

Figure 5B:
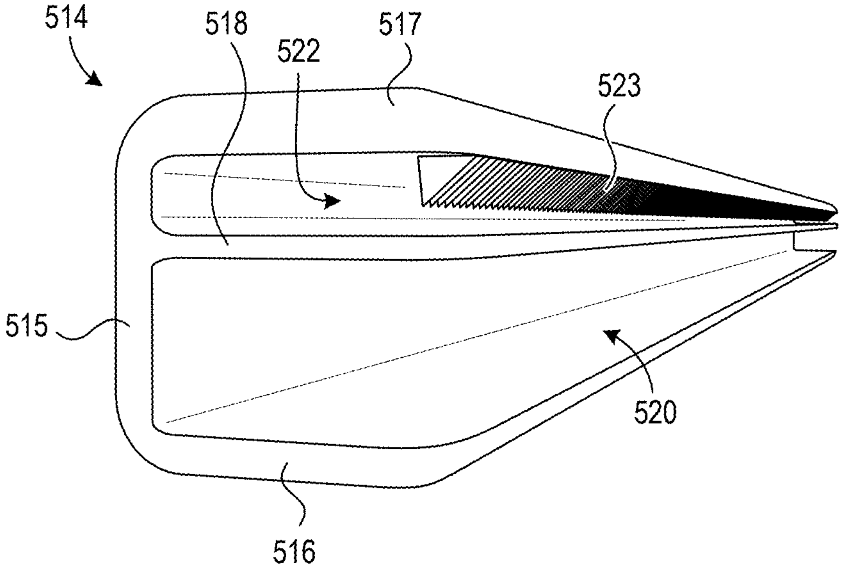

FIG. 5B is an enlarged, perspective view of one of the clips 514. As shown, the clip 514 includes a spine 515 with a first (e.g., lower) flange or extension 516 and a second (e.g., upper) flange or extension 517 extending therefrom to form a general "C" shape. A third flange or extension 518 extends from the spine 515 between the first flange 516 and the second flange 517. Each of the first flange 516, the second flange 517, and the third flange 518 are parallel to each other and perpendicular to the spine 515. The first flange 516 and the third flange 518 define a first recess 520 therebetween. Similarly, the second flange 517 and the third flange 518 form a second recess 522 therebetween. The first recess 520 can be sized and shaped to receive a portion of a laptop panel, such as a portion of the base panel 104 of the laptop 100 of FIGS. 1A-1D. The second recess 522 can be sized and shaped to receive a portion of the panel 512 (FIG. 5A). The first recess 520 and the second recess 522 can therefore have different dimensions.

The clip 514 further includes a retention mechanism 523 for releasably securing the clip 514 to the panel 512. In the illustrated embodiment, for example, the retention mechanism 523 includes a plurality of angled teeth, barbs, or tabs. In various embodiments, the angled teeth, barbs, or tabs can be rigid, slightly flexible, and/or deployable between an unlocked and a locked configuration. In some embodiments, the retention mechanism 523 is omitted and the clip 514 is coupled to the panel 512 via a friction fit and/or secured via adhesion such as glue or heat. In some embodiments, the clip 514 is composed of a rigid material such as plastic, stainless steel, or the like. In other embodiments, the clip 514 can be composed of a material with some degree of elasticity (e.g., rubber, silicone, etc.).

Figure 5C:
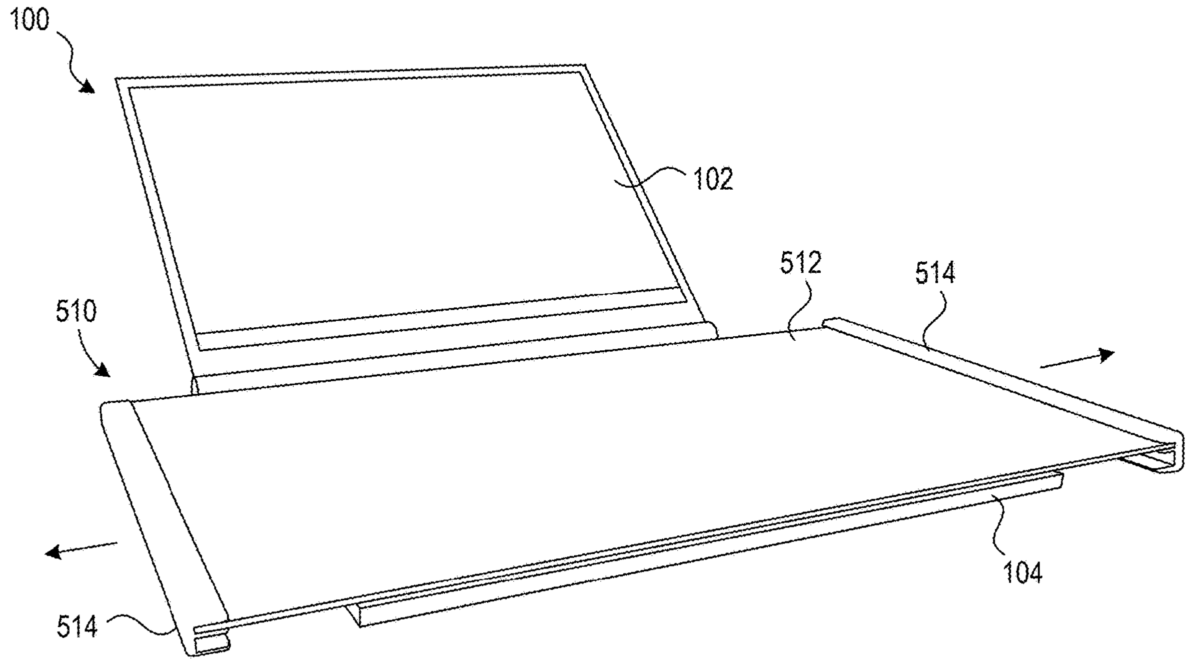
Figure 5D:
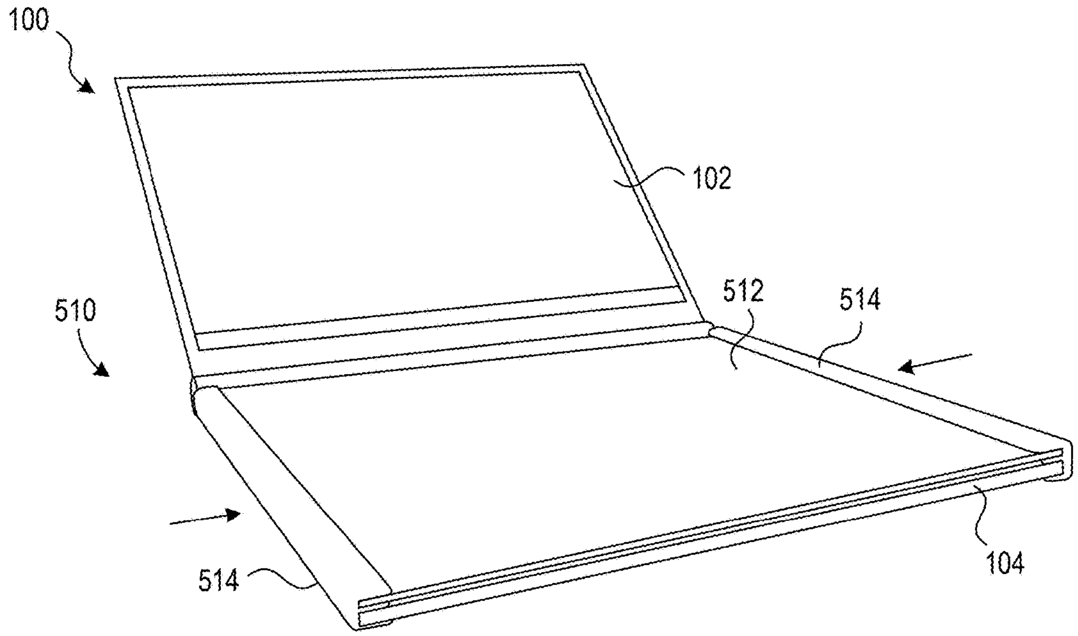
Figure 5E:
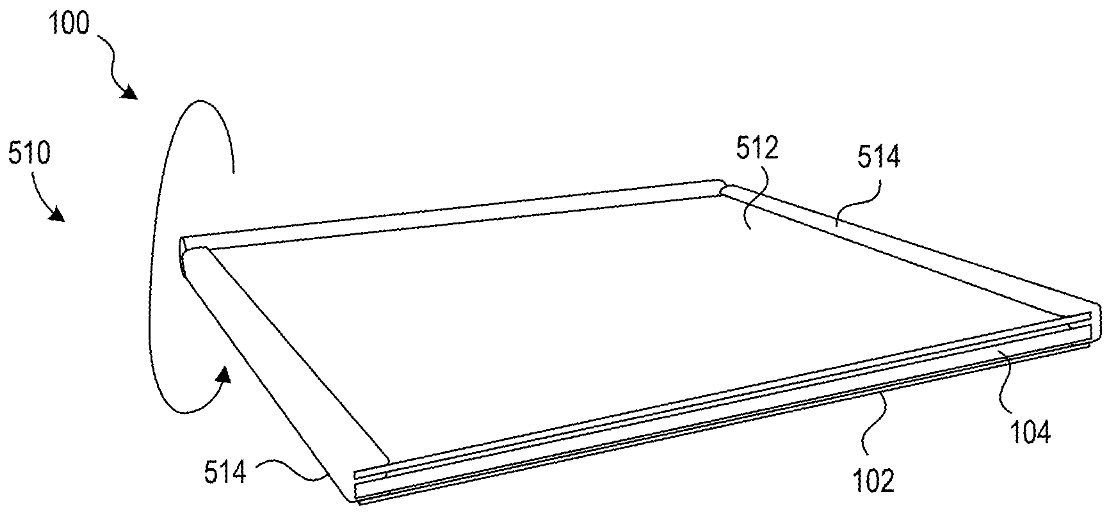

The cover 510 can be coupled to a laptop computer such as the laptop 100 to cover and/or protect the keyboard 105 and the touchpad 106 when the laptop 100 is in tablet mode. FIG. 5C is an isometric view illustrating a process of coupling the cover 510 to the laptop 100, FIG. 5D is an isometric view illustrating the cover 510 coupled to the laptop 100, and FIG. 5E is an isometric view of the laptop 100 in tablet mode with the cover 510 coupled thereto. As shown in FIG. 5C, a user can place the panel 512 over the base panel 104 and stretch the panel 512 by pulling the clips 514 apart as shown by the arrows in FIG. 5C until the clips 514 extend past edges of the base panel 104. The edges of the base panel 104 are then positioned in the first recess 520 of the clips 514, as shown in FIG. 5C. The elasticity of the panel 512 pulls the clips 514 toward one another as shown by the arrows in FIG. 5D to secure the cover 510 to the base panel 104. The laptop 100 can be converted into tablet mode by rotating the top panel 102 relative to the base panel 104, as described above with reference to FIGS. 1B-1D and shown in FIG. 5E.

The cover 510 therefore covers the keyboard 105 and the touchpad 106 of the laptop when in tablet mode, and is expected to provide similar benefits as those described above with respect to the covers described with reference to FIGS. 2A-4H. Relative to the covers described with reference to FIGS. 3A-4H, however, the cover 510 does not include material that extends between the top panel 102 and the base panel 104 when the laptop 100 is in tablet mode, although a portion of the clips 514 may extend at least partially into the space between the top panel 102 and the base panel 104.

Figure 6:
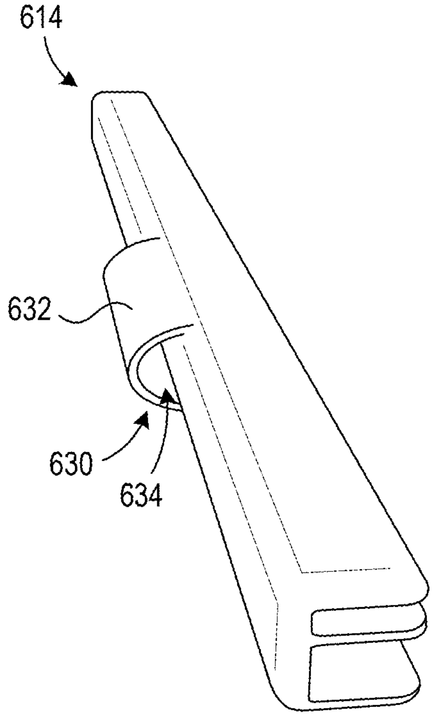
FIG. 6 illustrates a portion of a keyboard cover having an accessory holding feature and configured in accordance with embodiments of the present technology.

The keyboard covers described herein can have additional features and functions beyond covering and protecting laptop keyboards and touchpads. FIG. 6, for example, is an isometric view of a clip 614 configured in accordance with embodiments of the present technology and that can be used with the keyboard cover 510 of FIG. 5A (e.g., instead of the clip 514). The clip 614 can be generally similar to or the same as the clip 514 but further includes an accessory holding feature 630, such as a pen or stylus holder. The accessory holding feature 630 includes a rounded bridge 632 that defines an opening 634 sized and shaped to receive a pen and/or stylus. In other embodiments, the accessory holding feature 630 can have other mechanisms and/or configurations, including but not limited to fully enclosed compartments, partially enclosed friction based holder (e.g., a snap-fit clip), pockets, magnetic retainers, or the like. Although not shown, other embodiments of the covers described herein can also include accessory holding features generally similar to the accessory holding feature 630 of FIG. 6. Any of the keyboard covers described herein may also include one or more holes designed to generally align with laptop vents and/or otherwise positioned to enable proper ventilation when the cover is coupled to the laptop. The holes can optionally be covered by a mesh or similar breathable material.

As one skilled in the art will appreciate from the foregoing disclosure, various modifications to the described embodiments can be made without deviating from the scope of the present technology. For example, many of the components described with respect to a particular embodiment can be incorporated into or used with various components described with respect to a different embodiment. Moreover, certain features can be omitted from, or added to, the described embodiments without deviating from the scope of the present technology. Likewise, although steps are presented in a given order, alternative embodiments may perform steps in a different order. Accordingly, the present technology is not limited to the embodiments specifically identified herein.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof, means any connection or coupling, either direct or indirect, between two or more elements; the coupling or connection between the elements can be physical, logical, or a combination thereof. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. As used herein, the phrase “and/or” as in “A and/or B” refers to A alone, B alone, and A and B.

Where a range of values is provided, it is understood that each intervening value, to the tenth of the unit of the lower limit unless the context clearly dictates otherwise, to between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither, or both limits are included in the smaller ranges is also encompassed within the disclosure, subject to any specifically excluded limit in the stated range. Where the stated range includes one or both of the limits, ranges excluding either or both of those included limits are also included in the disclosure.

It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A keyboard cover for use with a convertible laptop-tablet device having a base panel with a keyboard and convertible between a laptop mode and a tablet mode, the keyboard cover comprising:

a first clip having a first recess and a second recess, the first recess being sized and shaped to receive a first portion of the base panel of the laptop-tablet device;

a second clip having a third recess and a fourth recess, the third recess being sized and shaped to receive a second portion of the base panel of the convertible laptop-tablet device; and a panel composed of an elastic material and extending between the first clip and the second clip, wherein the panel is coupled to the first clip at the second recess and the second clip at the fourth recess, wherein the keyboard cover is configured to be coupled to the convertible laptop-tablet device by positioning the first portion of the base panel in the first recess of the first clip and the second portion of the base panel in the third recess of the second clip, and wherein, when the keyboard cover is coupled to the laptop-tablet device, the panel (a) covers the keyboard, and (b) provides an inward force to maintain the first portion of the base panel in the first recess of the first clip and the second portion of the base panel in the third recess of the second clip.

2. The keyboard cover of claim 1 wherein the elastic material comprises neoprene, nylon, polyester, silicone, natural rubber, synthetic rubber, or foam.

3. The keyboard cover of claim 1 wherein the panel has a thickness of between about 0.1 cm and about 2 cm.

4. The keyboard cover of claim 1, further comprising a secondary patch coupled to the panel, wherein the secondary patch is composed of a different material than the panel.

5. The keyboard cover of claim 1 wherein the first clip further comprises:

a spine;

a first flange extending from the spine;

a second flange extending from the spine; and a third flange extending from the spine and positioned between the first flange and the second flange, wherein the first recess is formed between the first flange and the third flange and the second recess is formed between the second flange and the third flange.

6. The keyboard cover of claim 1 wherein the first clip includes a retention mechanism configured to retain the panel in the second recess.

7. The keyboard cover of claim 6 wherein the retention mechanism includes a plurality of teeth or barbs.

8. The keyboard cover of claim 1 wherein the first clip further includes an accessory holding feature.

9. A keyboard cover for use with a convertible laptop-tablet device having a base panel with a keyboard and convertible between a laptop mode and a tablet mode, the keyboard cover comprising:

a panel having a first segment, a second segment, and a third segment, wherein the first segment is between the second segment and the third segment, and wherein each of the segments has a size and a shape that corresponds to a size and a shape of the base panel of the laptop-tablet device;

a first connector pad positioned on a first side of the panel at the second segment; and a second connector pad positioned on a second side of the panel, opposite the first side, at the third segment, wherein the first connector pad and the second connector pad are configured to be releasably coupleable to each other, wherein the keyboard cover is configured to cover the base panel of the laptop-tablet device by receiving the base panel at the first segment and folding the second segment and the third segment relative to the first segment such that (a) the first segment is on a first side of the base panel and the second segment and the third segment are on a second side of the base panel, opposite the first side, (b) the first segment, the second segment, and the third segment are substantially parallel, and (c) the first connector pad is releasably coupled to the second connector pad.

10. The keyboard cover of claim 9 wherein the panel is composed of felt, nylon, leather, neoprene, polyester, silicone, natural rubber, synthetic rubber, or foam.

11. The keyboard cover of claim 9 wherein the panel has a thickness of between about 0.05 cm and about 0.4 cm.

12. The keyboard cover of claim 9 wherein the panel is a unitary structure.

13. The keyboard cover of claim 12 wherein a first boundary between the first segment and the second segment and a second boundary between the first segment and the third segment each have a thickness that is less than a thickness of other portions of the panel.

14. The keyboard cover of claim 9 wherein the first connector pad and the second connector pad collectively comprise a hook-and-loop fastener.

15. A keyboard cover for use with a convertible laptop-tablet device having a base panel with a keyboard and convertible between a laptop mode and a tablet mode, the keyboard cover comprising:

a sleeve, the sleeve including— a first planar surface, a second planar surface opposite from and parallel to the first planar surface, lateral edges connecting the first planar surface and the second planar surface, and a slot extending through the sleeve, wherein the slot is sized and shaped to receive the base panel of the laptop-tablet device such that the first planar surface covers the keyboard when the laptop-tablet device is in a tablet mode.

16. The keyboard cover of claim 15, further comprising a secondary panel coupled to the first planar surface, wherein the secondary panel is composed of a different material than the sleeve.

17. The keyboard cover of claim 16 wherein the secondary panel is composed of a stiffer material than the sleeve.

18. The keyboard cover of claim 16 wherein the secondary panel is composed of leather, and wherein the sleeve is composed of neoprene.

19. The keyboard cover of claim 15 wherein the sleeve is composed of a compressible and/or elastic material.

20. The keyboard cover of claim 15 wherein the second planar surface has a thickness of between about 0.05 cm and about 0.4 cm.

* * * * *